B. STOUGHTON.
PROCESS OF GENERATING HEAT IN FUSION FURNACES.
APPLICATION FILED APR. 8, 1912.
1,117,274.
Patented Nov. 17, 1914.
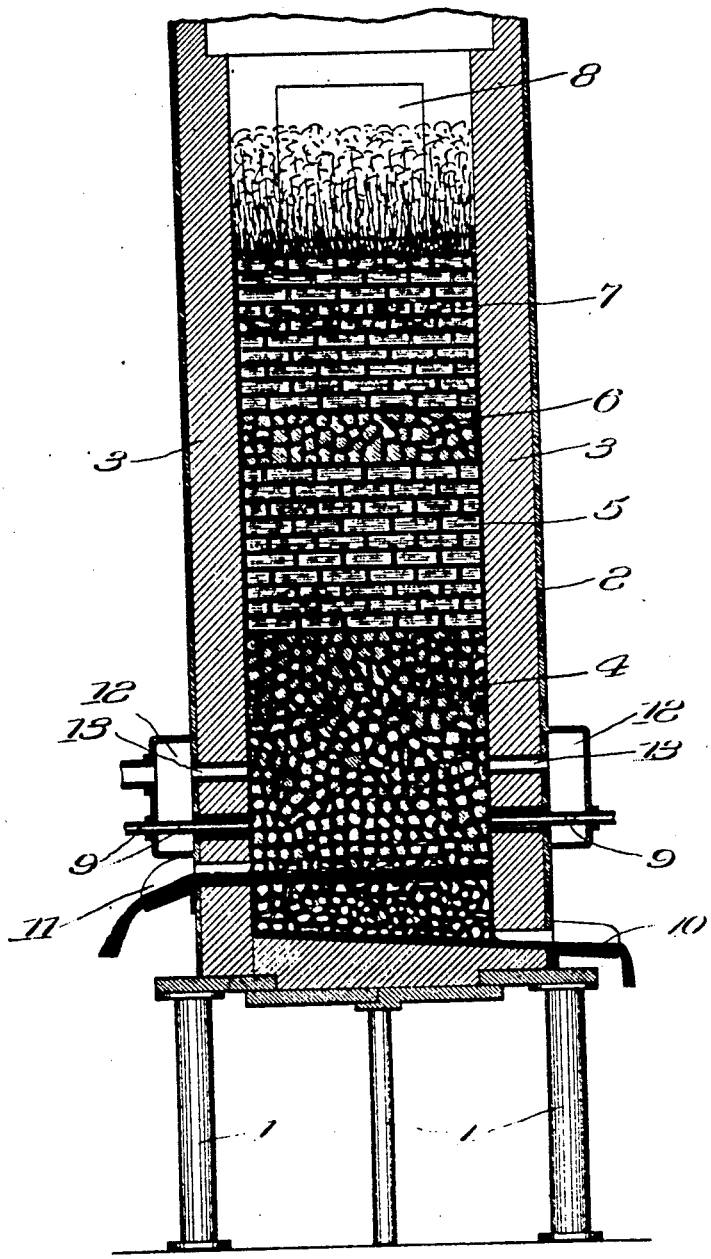
WITNESSES:
Alfred Wilkinson
J. R. Millward
INVENTOR.
Bradley Stoughton

UNITED STATES PATENT OFFICE.

BRADLEY STOUGHTON, OF NEW YORK, N. Y.

PROCESS OF GENERATING HEAT IN FUSION-FURNACES.

1,117,274.     Specification of Letters Patent.     Patented Nov. 17, 1914.

Application filed April 8, 1912. Serial No. 689,391.

*To all whom it may concern:*

Be it known that I, BRADLEY STOUGHTON, a citizen of the United States, residing at New York city, in the county of New York and State of New York, have invented new and useful Improvements in Processes of Generating Heat in Fusion-Furnaces, of which the following is a specification.

My invention consists in a new process for generating heat and is particularly applicable to the melting of metals and the smelting of ores. Fluid fuel and solid fuel are used together, but are burned in a new manner, involving a new principle and with new results. The essential features are the use of sufficient fluid fuel to supply all or practically all the heat required, and the use of the minimum quantity of solid fuel whose characteristic function is to be maintained incandescent for the purpose of igniting and insuring the complete consumption of the fluid fuel without waste. It is an essential feature to admit enough air to insure complete combustion of the fluid fuel, and in addition thereto merely enough surplus air to maintain the solid fuel incandescent, it being the intent to consume the latter as slowly as possible, thus using the minimum of solid fuel and generating practically the entire heat for melting the metal from the fluid fuel. If the solid fuel could be maintained at incandescence without any consumption thereof, that would be the ideal. Any desirable form of solid fuel may be used; for instance coal or charcoal, but probably coke will be generally used. Any desirable form of liquid of fluid fuel may be used for instance a combustible gas, either natural or generated, but probably oil will generally be used, injected in vaporized form mixed with air, by means of blow-pipes through the twyer holes or by other convenient means. An equivalent might be used like pulverized fuel.

My process may desirably be practised in any suitable furnace by depositing at the bottom of the furnace a bed containing coke or other suitable solid fuel, on this a layer of metal or ore, then a layer of coke and so on. The coke bed is then ignited and the oil injected into said incandescent mass with sufficient air to insure complete combustion of the oil and merely enough in addition to maintain the coke at incandescence, with the slowest rate of consumption. As the heat for melting is obtained substantially all from the oil, the layers of coke are merely intended to replace the unavoidable loss from the bed, and therefore said layers are very thin, containing but a fraction of the amount used in ordinary practice.

My invention is illustrated by reference to the drawing herewith showing a cupola in vertical section. In this 1 1 indicate the pillars, supporting a cupola having a steel shell 2 and a fire-brick lining 3. The bed of coke 4 supports the first layer of pig iron 5. Another layer of coke 6 supports a second layer of pig iron 7. As aforesaid these layers of coke in my process are very thin. The charging door 8 is used for the introduction of the coke, pig iron, and any flux that may be used.

12 is the wind box and 13 the usual twyers.

The aforesaid parts are old and well known in coupla practice, and corresponding parts, in blast furnaces, but thereto I have added the blow pipes 9 9 to inject the gaseous or liquid fuel, directly into the incandescent coke, which is a new feature. As shown, these blow-pipes enter through air pipes or lower twyers, which carry air for immediate intermixture with the injected oil. The supply of air through both upper and lower twyers may be controlled so that the correct amount only will be admitted. The fused metal runs off through the spout 10 and the slag or cinder through the spout 11. Where oil is used it should be first thoroughly vaporized or atomized by any suitable means.

A heated blast of air may be used, and steam for atomizing and injecting the oil, if desired. I do not limit myself to injecting the oil and air together for they may be injected at different points and in different manners. By injecting the oil directly into the bed of incandescent coke, perfect combustion of the oil is obtained without deposition of soot or unconsumed carbon.

The advantages of my process, whereby coke is to a very large extent replaced by fluid fuel, are that in many localities fluid fuel is cheaper than coke; the melted metal, dropping through the zone of combustion, will not suffer so much oxidation and waste as in old processes, because the injected air is always mixed with combustible gaseous material with which it unites by preference, and that a very trifling quantity of the injurious impurities, such as sulfur and phosphorus, are taken up by the metal, owing to the fact that much less coke is used. For these reasons it sometimes is advantageous and economical to employ my process even in localities where oil is not cheaper than an equivalent amount of solid fuel. Furthermore the fluid fuel is thoroughly consumed, and much more completely consumed, than in preceding processes, so that there is no waste and no accumulation of graphite or reduced carbon.

My process may be practised with, or applied to, many different forms of furnaces in common use, for instance cupolas, smelting furnaces and some forms of reverberatory furnaces. However, I do not intend to limit my process to any particular form of furnace, but intend it to be practised with any form of furnace with which it may be desirable, and for the melting or reduction of iron or other metals or minerals or for other purposes.

My invention will make possible the smelting of ores in localities where oil is cheap, but where smelting has heretofore been commercially impossible on account of the high cost of coke due to transportation.

I claim,—

1. The herein described process of generating heat in a furnace, which consists in depositing solid fuel in the furnace, igniting the fuel, injecting liquid fuel, and introducing only sufficient air fully to consume the fluid fuel and to maintain very slow combustion of the solid fuel.

2. The herein described process of generating heat in a furnace, which consists in forming a bed in said furnace containing solid fuel, igniting the fuel, injecting fluid fuel and blowing in sufficient air fully to consume the fluid fuel, but in addition only enough air to maintain a very slow combustion of the solid fuel.

3. In the art of smelting or fusing metallic substances, the herein described process which consists in depositing in a furnace solid fuel and metallic material, introducing fluid fuel and introducing air, the quantity of air admitted being sufficient fully to consume the fluid fuel and in addition to maintain a very slow combustion of the solid fuel.

4. In the art of smelting or fusing metallic substances, the herein described process which consists in maintaining a bed containing solid fuel at the bottom of a furnace, depositing a charge of metallic material thereon, igniting the solid fuel and injecting fluid fuel and air, the quantity of air introduced being only sufficient to insure complete combustion of the fluid fuel and to maintain a very slow combustion of the solid fuel.

5. The herein described process of smelting or fusing metallic substances which consists in maintaining a bed of coke in the bottom of the furnace, depositing a charge of metallic material thereon, injecting fluid fuel in atomized or vaporized condition and introducing sufficient air completely to consume the fluid fuel and very slowly to consume the solid fuel.

6. The herein described process of fusing and smelting metallic substances which consists in depositing a bed containing coke in the bottom of the furnace, depositing layers of metallic material and layers of coke thereon and injecting atomized oil mixed with air, the quantity of air being sufficient fully to consume the oil and only very slowly to consume the coke in the bed, the layers of coke being merely sufficient in amount to maintain the bed.

In testimony whereof I have signed my name to this specification in the presence of two subscribing witnesses.

BRADLEY STOUGHTON.

Witnesses:
ARTHUR H. ELLIOTT,
P. LINDGREN.